Patented Sept. 4, 1945

2,383,933

UNITED STATES PATENT OFFICE 2,383,933

PREPARATION OF RESINOUS DISPERSIONS

Albert Howard Bump, Watertown, Mass., assignor to Monsanto Chemical Company, St. Louis, Mo., a corporation of Delaware No Drawing. Application December 10, 1942, Serial No. 468,545

11 Claims. (Cl. 106—238)

The present invention relates to an improved method of making alkaline dispersions of resins in water, and particularly dispersions of resins of the type described as sizing adjuncts in the copending application of William S. Wilson and Albert H. Bump, Serial No. 452,670, filed July 28, 1942.

According to the above application alkaline dispersions of resins of the type referred to are preferably prepared by first forming a preliminary dispersion of relatively high concentration, after which the concentrated dispersion may be diluted to the desired extent. In general, the resin, caustic soda or other alkali and water in appropriate amounts are heated and simultaneously stirred in any suitable reaction vessel at temperatures between about 140 and 200° C. In order to make a concentrated dispersion the various materials used may be added in amounts varying from about 50 to 80% of resin, 4 to 14% of alkali and 6 to 46% of water, although it is preferable to use the smaller proportions of resin, as the resulting dispersion may be more readily removed from the reaction vessel. The charge is finally cooled down to 60 to 90° C. depending upon the amount of resin employed, and is then removed, whereupon it cools to a consistency varying from a viscous fluid mass to a hard and brittle solid, which may be ground to a powder.

Although it is possible to use the concentrated dispersion prepared as described above directly in the sizing of paper pulp, in general it is preferable to dilute the dispersion before adding it to the beater. This is preferably accomplished by mixing the concentrated dispersion with from 1500 to 4000 parts by weight of water for each 100 parts by weight of the dispersion, depending upon the amount of resin in the dispersion. The mixing is preferably carried out with the aid of vigorous stirring and at temperatures varying from 10 to 65° C., depending upon the amount of resin in the concentrated dispersion. The resulting product is in the form of a milky dispersion which does not settle to any great extent upon standing.

The above described method results in dispersions which may be readily mixed with or dispersed in the usual pulpy mass in the paper beater, but has the disadvantage that relatively large amounts of alkali are required, that is, a relatively high degree of neutralization of the acid constituents of the resin is required for satisfactory dispersion. It is accordingly a primary object of the present invention to provide an improved method of making the concentrated and dilute dispersions of the type described above, i. e., a method which permits a marked reduction in the amount of alkali required for satisfactory dispersion. Still further objects and advantages of the invention will appear from the following description and appended claims.

The invention is carried out in general by mixing the various ingredients of the desired dispersion, namely the resin, alkali and water, in an autoclave, wherein they are subjected to temperatures capable of developing pressures higher than atmospheric. The manner of forming both the concentrated and dilute dispersions is otherwise much the same as in the method described in the above mentioned copending application. Thus, the mixtures forming the dispersions are heated at temperatures between 140 and 200° C., and are then permitted to cool down to 60 to 90° C. prior to removal from the reaction vessel. By mixing and heating the ingredients of the dispersion under pressure, however, much less alkali is required for satisfactory dispersion. Thus, the resin requires only about 30 to 50% neutralization, when an autoclave is used, whereas without an autoclave, at least 88% neutralization is necessary.

In preparing concentrated dispersions as described above the amount by weight of water employed is usually less than the amount by weight of the resin being treated. Dilute dispersions which are highly suitable for use in paper sizing are then prepared by mixing, usually with agitation, from 1500 to 6000 parts by weight of water with every 100 parts by weight of the concentrated dispersion. In some instances the water of dilution should be warm, i. e. at a temperature as high as 65° C., but in many cases water as cool as 10° C. may be used.

A further understanding of the invention will be obtained from the following examples:

Example I

Ten thousand two hundred and thirteen grams of rosin-maleic anhydride resin, made by heating 3 mols of H rosin with 2 mols of maleic anhydride at 160 to 170° C. for about 4 hours and having a theoretical acid number of 338, were placed in an autoclave together with 1,036 grams of 95% caustic soda and 6,800 grams of water, and then heated up to 160 to 165° C., which required about one hour. The mixture was maintained at 160 to 165° C. for about 30 minutes, during which time the maximum pressure attained was about 90 pounds per square inch. The mass was then permitted to cool to about 80° C., which required about 45 minutes, and finally removed from the autoclave by blowing with air. The resulting product was about 40% neutralized, and upon cooling to room temperature was in the form of a viscous mass.

The above dispersion was diluted by mixing 3000 parts by weight of water which was at a temperature of 20 to 30° C., with every 100 parts by weight of the dispersion, while simultaneously agitating the aqueous mass. The resulting dilute dispersion may be used as a sizing adjunct in the sizing of paper pulp according to the methods described in the above mentioned copending application.

*Example II*

Three hundred and seventy three grams of rosin-maleic anhydride resin, made by heating 3 mols of H rosin with 2 mols of maleic anhydride at 160 to 170° C. for about 4 hours and having a theoretical acid number of 338, were placed in an autoclave together with 37.8 grams of 95% caustic soda and 55.5 grams of water, and then heated up to 160° C., which required about one hour. The mixture was maintained at 160° C. for about 30 minutes, during which time the maximum pressure attained was about 70 pounds per square inch. The mass was then permitted to cool to about 60° C., which required about 2½ hours, and finally removed from the autoclave. The resulting product was about 41% neutralized, and upon cooling to room temperature was in the form of a hard and brittle solid, which was ground to a powder.

The powdered material obtained as described above was dispersed in water by mixing 4000 parts by weight of water, which was at a temperature of 60° C., with every 100 parts by weight of the powder, while simultaneously agitating the mass. The resulting milky dispersion may be used as a sizing adjunct in the sizing of paper pulp.

*Example III*

Two hundred and forty grams of rosin-citraconic anhydride resin, made by heating 3 mols of G rosin and 2 mols citraconic anhydride at 200° C. for 4 hours and having a theoretical acid number of 330, were placed in an autoclave with 29.8 grams of 95% caustic soda and 160 grams of water, and then heated up to 150° C., which required about ½ hour. The mixture was further heated between 150 and 160° C. for about ½ hour, during which time the maximum pressure attained was about 75 pounds per square inch. The mass was then permitted to cool to about 85° C., which required about ½ hour, and finally removed from the autoclave by blowing with air. The resulting product was about 49.5% neutralized, and upon cooling to room temperature was in the form of a viscous mass. Upon diluting 100 parts by weight of the above dispersion with 1650 parts by weight of water, which was at a temperature of 20 to 25° C., and simultaneously agitating, a dilute dispersion was obtained which can be used as an adjunct to ordinary rosin size in the sizing of paper pulp.

*Example IV*

A terpinene-maleic anhydride resin was made by carefully heating 240 grams of terpinene with 147 grams of maleic anhydride up to 195° C., which required about 1½ hours, and then heating the mixture at 195° C. for 3½ hours, after which the unreacted constituents were distilled off under vacuum. Two hundred and eighty nine grams of the above resin, which had a theoretical acid number of 515, were placed in an autoclave with 50.4 grams of 95% caustic soda and 190 grams of water, and then heated up to 160° C., which required about ½ hour. The mixture was further heated at 160° C. for another ½ hour, during which time the maximum pressure attained was about 70 pounds per square inch, and then permitted to cool to 85° C., which required about ½ hour. The mass was finally removed from the autoclave by blowing with air, and upon cooling to room temperature was in the form of a syrupy mass which was about 45% neutralized. Upon diluting 100 parts by weight of the above dispersion with 6000 parts by weight of water at room temperature, a dilute dispersion was obtained which is suitable for use as an adjunct in the sizing of paper pulp.

In preparing the various resinous dispersions of the type described herein, it is possible to employ autoclave temperatures varying from 140 to 200° C., although temperatures in the neighborhood of 160 to 170° C. are usually preferable. Moreover the maximum pressures existing in the autoclave during the preparation of the dispersion may vary from 55 to 230 pounds per square inch. When the preferred temperatures are employed however, the maximum pressure obtained is usually in the neighborhood of 70 to 80 pounds per square inch.

Although caustic soda is the only alkali referred to in the examples, it is to be understood that other similar alkalies, such as caustic potash, may also be employed. Moreover, the time of heating and cooling in the autoclave may be varied widely, depending on the quantities of material used. In general, however, the entire operation may be carried out in from two to five hours.

It is usually necessary to first prepare a relatively concentrated dispersion, as it is difficult to form dilute dispersions directly without employing excessive amounts of alkali. Moreover, the preparation of a preliminary concentrated dispersion is of considerable advantage to the paper maker, who usually does not make his own sizing agents, as it permits considerable saving in freight. It is also possible in some instances to add the concentrated dispersion, which varies in form from a thin syrupy mass to a hard and brittle solid, directly to the beater without first forming a dilute dispersion.

In using the resinous dispersions described herein as sizing adjuvants, the beater is first charged with a predetermined amount of pulp, after which ordinary rosin size is added in the form of a dilute aqueous and partially or wholly neutralized dispersion in amounts capable of supplying from about ¼ to 4% of rosin based on the weight of the dry pulp used. A dilute dispersion of resin prepared as described herein is then added to the pulp suspension in an amount sufficient to supply from 5 to 40% of the resin based on the weight of the rosin used. After thoroughly beating the mixture the pulp is then ready for the addition of aluminum sulfate or like precipitating and fixing agent, which may be added in amounts varying from about 1 to 5% based on the dry pulp weight, depending upon the type of paper which it is desired to make. However, the various materials employed may be added in any desired order, or simultaneously.

Although reference has been made in the examples to only a few of the resinous materials which may be treated to advantage by the methods of this invention, it is to be understood that the invention is equally applicable to other resinous sizing adjuncts of the type described in the above mentioned application for Letters Patent. Thus, in general it is possible to treat advantageously in accordance with this invention the resinous reaction product of any organic compound of acidic character containing a —CO—C=C group with an organic compound containing a conjugated double bond or capable of forming a conjugated double bond upon being heated.

Where reference is made in the claims to "an acid reacting synthetic resin of the type described herein," it is to be understood that this refers broadly to synthetic resins of the above general class.

What I claim is:

1. The method of preparing a relatively concentrated aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with an alkaline substance and water and heating the mixture under superatmospheric pressure and at a temperature between 140 and 200° C., said alkali being supplied in an amount sufficient to neutralize from 30 to 50% of the acid content of said resin, and said water being supplied in an amount by weight sufficient to produce an aqueous dispersion of said resin.

2. The method of preparing an aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises heating a mixture of the resin with an alkali and water at a maximum temperature varying from 140 to 200° C., the heating being carried out in an autoclave, whereby maximum pressures varying from 55 to 230 pounds per square inch are attained, said alkali being supplied in an amount sufficient to neutralize from 30 to 50% of the acid content of said resin, and said water being supplied in an amount by weight sufficient to produce an aqueous dispersion of said resin.

3. The method of preparing a relatively concentrated aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with an alkali and water and heating the mixture under superatmospheric pressure in an autoclave at a temperature between 160 to 170° C., said alkali being supplied in an amount sufficient to neutralize from 30 to 50% of the acid content of said resin, and said water being supplied in an amount by weight sufficient to produce an aqueous dispersion of said resin.

4. The method of preparing an aqueous dispersion of an acid reacting synthetic resin of the type prepared by reacting an organic compound of acidic character containing —CO—C=C group with a substance selected from the group consisting of organic compounds containing a conjugated double bond and organic compounds capable of forming a conjugated double bond upon being heated, which comprises heating a mixture of the resin with an alkali and water at a maximum temperature varying from 160 to 170° C., the heating being carried out in an autoclave, whereby maximum pressures varying from 70 to 90 pounds per square inch are attained, said alkali being supplied in an amount sufficient to neutralize from 30 to 50% of the acid content of said resin, and said water being supplied in an amount by weight sufficient to produce an aqueous dispersion of said resin.

5. The method of preparing a relatively concentrated aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with an alkali and water and heating the mixture under superatmospheric pressure and at a temperature between 140 and 200° C., said alkali being supplied in an amount sufficient to neutralize from 30 to 50% of the acid content of said resin, and said water being supplied in an amount by weight sufficient to produce an aqueous dispersion of said resin.

6. The method of preparing a relatively concentrated aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with an alkali and water and heating the mixture under pressure and at a temperature between 140 and 200° C., said alkali being supplied in an amount sufficient to neutralize from 30 to 50% of the acid content of said resin, and said water being supplied in an amount by weight sufficient to produce an aqueous dispersion of said resin but less than the amount by weight of said resin.

7. The method of preparing a relatively dilute dispersion of an acid reacting synthetic resin of the type prepared by reacting an organic compound of acidic character containing a

—CO—C=C group with a substance selected from the group consisting of organic compounds containing a conjugated double bond and organic compounds capable of forming a conjugated double bond upon being heated, which comprises first preparing a relatively concentrated dispersion of said resin in water by heating a mixture of the resin with an alkali and water under pressure and at a temperature between 140 and 200° C., said alkali being supplied in an amount sufficient to neutralize from 30 to 50% of the acid content of said resin, and said water being supplied in an amount by weight sufficient to produce an aqueous dispersion of said resin but less than the amount by weight of said resin; and then diluting the resulting dispersion by mixing from 1500 to 6000 parts by weight of water with every hundred parts by weight of the dispersion.

8. The method of preparing a relatively concentrated aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with caustic soda and water and heating the mixture at a temperature of 160 to 170° C. and at a pressure of 70 to 90 pounds per square inch, said caustic soda being supplied in an amount sufficient to neutralize from 30 to 50% of the acid content of said resin, and said water being supplied in an amount by weight sufficient to produce an aqueous dispersion of said resin but less than the amount by weight of said resin.

9. The method of preparing a relatively dilute aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with caustic soda and water and heating the mixture at a temperature of 160 to 170° C. and at a pressure of 70 to 90 pounds per square inch, said caustic soda being supplied in an amount sufficient to neutralize from 30 to 50% of the acid content of said resin, and said water being supplied in an amount by weight sufficient to produce an aqueous dispersion of said resin but less than the amount by weight of said resin; and then diluting the resulting dispersion by mixing from 1500 to 6000 parts by weight of water at a temperature of 10 to 65° C. with every hundred parts by weight of the dispersion, while simultaneously agitating the mixture.

10. The method of preparing an aqueous dispersion of an acid reacting synthetic resin of the type prepared by reacting an organic compound of acidic character containing a —CO—C=C group with a substance selected from the group consisting of organic compounds containing a conjugated double bond and organic compounds capable of forming a conjugated double bond upon being heated, which comprises mixing the resin with an alkali and water, heating the mixture in an autoclave up to a temperature between 140 and 200° C., further heating the mixture at a temperature between 140 and 200° C. for a period of at least ½ hour, whereby a maximum pressure varying from 55 to 230 pounds per square inch is attained, allowing the mass to cool to a temperature between 60 to 90° C., and then removing the mass from the autoclave, said alkali being supplied in an amount sufficient to neutralize from 30 to 50% of the acid content of said resin, and said water being supplied in an amount by weight sufficient to produce an aqueous dispersion of said resin.

11. The method of preparing an aqueous dispersion of an acid reacting synthetic resin as defined in claim 10, further characterized in that the resin being treated is the reaction product of rosin and maleic anhydride.

ALBERT HOWARD BUMP.